US008269582B2

(12) United States Patent
Taskila et al.

(10) Patent No.: US 8,269,582 B2
(45) Date of Patent: Sep. 18, 2012

(54) TUNING ELEMENT ASSEMBLY AND METHOD FOR RF COMPONENTS

(75) Inventors: Jari M. Taskila, Meriden, CT (US); Teppo M. Lukkarila, Wallingford, CT (US); Andrzej E. Stanek, New Haven, CT (US)

(73) Assignee: Alcatel Lucent, Paris (FR)

( * ) Notice: Subject to any disclaimer, the term of this patent is extended or adjusted under 35 U.S.C. 154(b) by 425 days.

(21) Appl. No.: 12/609,890

(22) Filed: Oct. 30, 2009

(65) Prior Publication Data

US 2011/0102110 A1 May 5, 2011

(51) Int. Cl.
*H01P 7/06* (2006.01)
*F16B 21/00* (2006.01)

(52) U.S. Cl. ......................... 333/232; 333/235; 411/339

(58) Field of Classification Search .................. 333/207, 333/209, 219.1, 235, 231, 232, 223, 224, 333/226, 203; 411/339
See application file for complete search history.

(56) References Cited

U.S. PATENT DOCUMENTS

| | | | | | |
|---|---|---|---|---|---|
| 3,125,734 | A * | 3/1964 | Ward | ............................ | 333/232 |
| 3,311,839 | A * | 3/1967 | Rutulis | .......................... | 330/4.9 |
| 4,035,749 | A * | 7/1977 | Slocum et al. | ................ | 333/232 |
| 4,376,923 | A * | 3/1983 | Curtinot et al. | ............... | 333/232 |
| 4,380,747 | A * | 4/1983 | Curtinot et al. | ............... | 333/202 |
| 4,445,100 | A * | 4/1984 | Decker | ......................... | 333/207 |
| 4,990,871 | A | 2/1991 | Reindel | | |
| 5,033,924 | A * | 7/1991 | Cosenza | ....................... | 411/282 |
| 5,049,842 | A * | 9/1991 | Ishikawa et al. | .............. | 333/235 |
| 6,198,363 | B1 | 3/2001 | Vuoppola et al. | | |
| 6,198,366 | B1 * | 3/2001 | Dahl et al. | .................... | 333/235 |
| 6,222,428 | B1 * | 4/2001 | Akesson et al. | .............. | 333/202 |
| 6,262,639 | B1 * | 7/2001 | Shu et al. | ...................... | 333/202 |
| 7,148,771 | B2 * | 12/2006 | Lamont | ......................... | 333/235 |
| 2003/0117229 | A1 * | 6/2003 | Remillard | .................... | 333/99 S |

FOREIGN PATENT DOCUMENTS

| | | | |
|---|---|---|---|
| EP | 0316813 | A2 | 5/1989 |
| GB | 1297224 | A | 11/1972 |
| JP | 10308612 | A | 11/1998 |

OTHER PUBLICATIONS

International Search Report for Application No. PCT/US2010/053499 dated Jun. 9, 2011.

* cited by examiner

*Primary Examiner* — Seungsook Ham
(74) *Attorney, Agent, or Firm* — Kramer & Amado, P.C.

(57) ABSTRACT

Various exemplary embodiments relate to a tuning element assembly and method for tuning an a radio frequency (RF) component, where the component has one or more walls defining a cavity, with at least one wall having at least one bore hole. A bushing is mounted in the bore hole in the wall, and a tuning element is slidably mounted and received in the bushing so that the tuning element projects inwardly through the bushing and into the cavity and is axially adjustable. A method of tuning an RF component also includes providing a bushing mounted in a bore in a wall of the RF component, sliding a tuning element that is slidably mounted and received in the bushing so that the tuning element projects inwardly through the bushing and into the cavity by a distance varying according to the sliding of the tuning element, monitoring a performance characteristic of the RF component, and releasing the tuning element so that a desired performance characteristic is achieved.

20 Claims, 3 Drawing Sheets

TUNING ELEMENT ASSEMBLY AND METHOD FOR RF COMPONENTS

TECHNICAL FIELD

Various exemplary embodiments disclosed herein relate generally to radio-frequency (RF) components and tuning elements therefor. More particularly, some various embodiments relate to moveable tuning elements that are moved relative to a cavity of the component order to provide tuning adjustment.

BACKGROUND

Various radio-frequency (RF) components are known that utilize a cavity as well as other features, such as for example one or more resonators, in the cavity. Some of these components may be used as filters. Often, it is desirable to adjust the characteristics of the cavity via a moveable tuning element that projects at least partially into the cavity. In the past, these moveable tuning elements have taken the form, for example, of a bendable plate placed inside the cavity, or a threaded screw that projects through a threaded bore in an outside wall of the cavity. Bending of the plate, or turning of the screw in order to cause the screw to be advanced into or retracted from the cavity, have been performed in order to change the configuration of the tuning element within the cavity.

While the known devices and methods have proved generally satisfactory, they each have certain disadvantages in practice, and it is desired to provide an improved tuning element and method that can be used to efficiently and conveniently tune a RF component having a cavity.

SUMMARY

In light of the present need for an improved tuning element assembly and method that can be used to efficiently and conveniently tune an RF component having a cavity, a brief summary of various exemplary embodiments is presented. Some simplifications and omissions may be made in the following summary, which is intended to highlight and introduce some aspects of the various exemplary embodiments, but not to limit the scope of the invention. Detailed descriptions of at least one preferred exemplary embodiment adequate to allow those of ordinary skill in the art to make and use the inventive concepts will follow in later sections.

Various exemplary embodiments relate to an improved tuning element assembly and method that can be used to efficiently and conveniently tune an RF component having a cavity.

One embodiment relates to an apparatus for tuning a radio frequency (RF) component having a wall with a bore through the wall, and a cavity, comprising a bushing adapted to be fit into the bore in the wall, and a tuning element slidably mounted and received in the bushing.

Another embodiment relates to a radio frequency (RF) component, comprising one or more walls defining a cavity, with at least one wall having at least one bore therethrough, a bushing mounted in a bore in the wall, and a tuning element slidably mounted and received in the bushing so that the tuning element projects inwardly through the bushing and into the cavity.

Yet another embodiment relates to a method of tuning an RF component, comprising steps of providing a bushing mounted in a bore in a wall of the RF component, sliding a tuning element that is slidably mounted and received in the bushing so that the tuning element projects inwardly through the bushing and into the cavity by a distance varying according to the sliding of the tuning element, monitoring a performance characteristic of the RF component, and releasing the tuning element when a desired performance characteristic is achieved.

It should be apparent that, in this manner, various exemplary embodiments enable convenient tuning adjustment. In a particular example, by sliding a tuning element held by a bushing, the cavity can be tuned in a simple and cost-effective manner.

BRIEF DESCRIPTION OF THE DRAWINGS

In order to better understand various exemplary embodiments, reference is made to the accompanying drawings, wherein.

DETAILED DESCRIPTION

Figure 1:
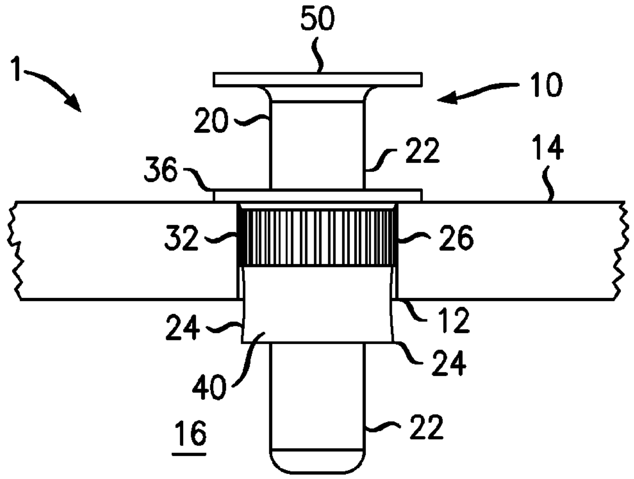
FIG. 1 illustrates a view of a tuning element assembly according to a first embodiment.

Referring now to the drawings, in which like numerals refer to like components or steps, there are disclosed broad aspects of various exemplary embodiments.

Figure 2:
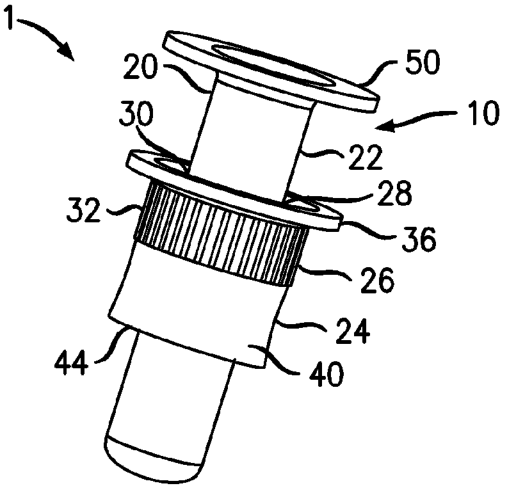
FIG. 2 is a perspective view of the assembly of FIG. 1.
Figure 3:
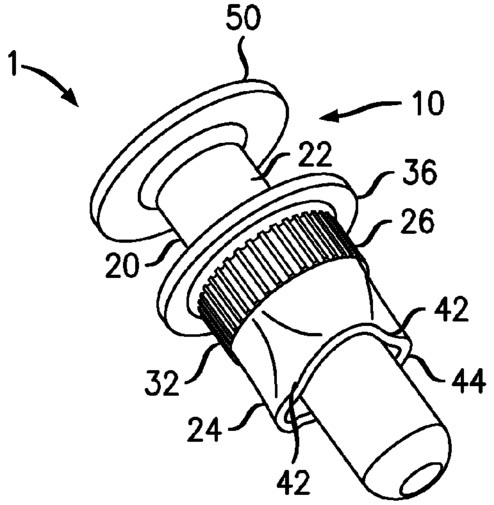
FIG. 3 is another perspective view of the assembly of FIG. 1
Figure 4:
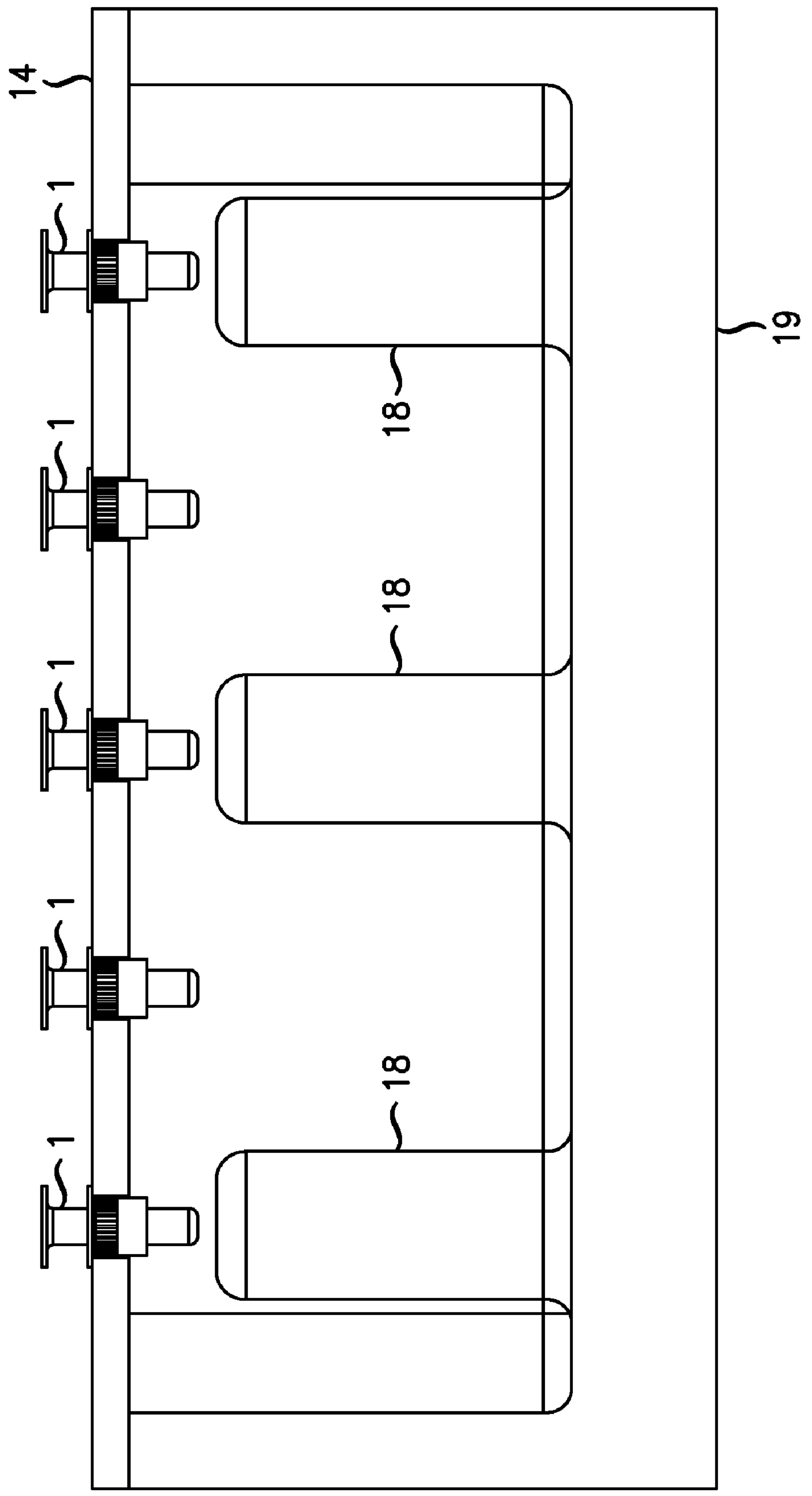
FIG. 4 is a cutaway side view showing the assembly of FIG. 1 installed in the wall of a RF component.

FIGS. 1 through 3 illustrate an embodiment of a tuning assembly 1. The tuning assembly 1 has a movable tuning element 10 that is adapted for installation to project through a bore hole 12 in a wall 14 of a RF component defining a cavity 16. In the example shown in FIG. 4, the RF component 14 is a filter having one or more tuning assemblies 1 and one or more resonators 18 disposed in the cavity. The wall 14 in the example if FIG. 4 is a top plate of a housing 19, with the top plate being removable from the remainder of the housing 19, and the cavity 16 being an space enclosed by the top plate and the housing 19. However, the RF component can be any RF component having a cavity.

Turning now to FIGS. 1-3, the tuning assembly 10 includes a movable element 10 having a main shaft 20. The shaft 20 is an elongated member, having a least a middle portion 22 of the shaft 20 being cylindrical. In the illustrated example, the shaft 20 is in the shape of a circular cylinder along its length. However, the shaft 20 may also take the form of a square, or hexagonal cylinder, or any other elongated shape. Moreover, the shaft 20 does not need to be cylindrical or constant diameter along its entire length.

The shaft 20 is disposed to project through and be supported by a bushing 24. The bushing 24 has at least at a middle portion 26 thereof an internal busing diameter 28 which is complimentary to an external shaft diameter 30 of at least the middle portion 22 of the shaft 20. These diameters provide an axial sliding relationship between the shaft 20 and the bushing 24. A lubricating material may be provided at this location if desired.

The bushing 24 also has a portion, in this case the middle portion 22, having an external middle portion outer diameter 32 that is configured to be received within the bore hole 12 projecting through the wall 14 of the RF component. In the example shown in FIGS. 1 through 3, the middle portion 26 of the bushing 24 has a knurled, grooved or roughened surface. Depending on the overall geometry of the bushing 24, this can provide some frictional press fit retaining force between the bushing 20 and the bore hole 12 when the bushing is installed in the bore hole 12.

An example of the bushing 24 will now be described in more detail. The bushing 24 has at its first end a mounting flange 36. The mounting flange 36 projects radially outward from the end of the middle portion 22. The mounting flange 36 provides a stop surface abutting the adjacent surface of the wall 12. In some embodiments, the mounting flange 36 may be soldered or affixed by adhesive to the wall 12, thus affixing the bushing 24 to the wall 14. Alternatively, the middle portion 26 may be press fit into the bore 11 of the wall 14 and the flange 36 serves mainly as a stop.

The middle portion 26 of the bushing 24 extends axially through a length generally equal to or greater than the thickness of the wall 12 at the mounting location. Also although described as a middle portion, the middle portion 26 in some embodiments may extend along any part of, or entirely along, the entire axial length of the bushing 24. In the example shown in the drawings herein, the bushing 24 has, at its second end opposite to the flange end, a skirt portion 40 which will be described in more detail below.

In the illustrated embodiment, the skirt portion 40 generally is tapered so that it flares outwardly towards the bushing 24 second end, but also has three inwardly bent regions 42. The inwardly bent regions 42 are particularly visible in FIG. 3, which has crease or bend lines to illustrate the inward bends. The inwardly bent regions 42 are each are angled radially inward such that the inward most points of the inwardly bent regions 42 form a triangle shape so that the inward most points have an interference fit with the shaft 20 and frictionally contact the outer surface of the shaft 20.

In this illustrated embodiment, a frictionally retained shaft 20 is thus disposed for sliding movement within the bushing 24, with some frictional resistance to the sliding movement being provided. The frictional resistance is provided to some degree at one or both of two locations. First, frictional resistance can be provided by contact of the inner diameter 28 of the middle portion 26 of the bushing 24 with the outer diameter 30 of the middle portion 22 of the shaft 20. Second, frictional resistance can be provided by the contact of the three inwardly bent regions 42 at the lower end of the skirt portion 40 of the bushing 24. The largest outer diameter of the skirt portion 40 is in this example the terminal end 44 of the skirt portion 40, which is of an outer diameter that is smaller than the inner diameter of the bore hole 12 in the wall 14 to permit the bushing 24 to be inserted into the bore hole 12.

The frictional resistance can be selected according to the application, but generally will be such that the tuning element can be moved either manually by a person or mechanically by an external tuning machine when desired. However, the frictional force is great enough that when no manual or machine manipulation is present, the shaft 20 will tend to stay in place with no axial movement during normal use of the RF component. For example, the force may selected to be great enough such that normal vibration such as occurs during use of the RF component will be sufficiently resisted by the frictional force.

Although the skirt portion 40 is illustrated as having three inwardly bent regions 42 for the convenience of manufacturing, the skirt portion 40 may feature more or less bent regions and/or other friction-providing designs. For example, the skirt 40 may be deformed to have simply one radially inwardly bent region, two inwardly bent regions, or a number greater than three. Also the reference to bent regions refers to the illustrated shape, but encompasses other shapes. The bent region shape may be manufactured by any forming process, adapted for the material used, such as for example by crushing an originally conical or cylindrical skirt region or by bending with a forming tool. If the bushing 24 is molded from a plastic material, the bent shape may be molded in the original molding process or the plastic material may be bent or crushed after molding. Further, instead of, or in addition to, one or more inwardly bent regions, one or more fingers or tabs can project inwardly from the skirt portion 40 to provide the interference with the shaft 20. Besides a conical taper, the skirt portion 40 can have other shapes. Also, one or more additional friction elements, such as an O-ring, may be provided at the skirt portion 40, in addition to or instead of the illustrated bent regions 42. For example, an O-ring or other bushing ring having a smaller diameter than the shaft 20 may reside within an interior channel provided on the skirt portion 40, or be clipped on to the end of the skirt portion 40 to provide a selected degree of interference and frictional resistance to axial movement of the shaft 20.

In addition, in some embodiments where the frictional contact between the cylindrical region of the shaft 20 and the interior diameter 28 of the bushing 24 is great enough, the skirt portion 42 and/or its associated friction interference features may be omitted.

The tuning element illustrated in the drawings includes an optional handle or cap 50 provided at a first end of the shaft 20. The handle or cap 50 maybe integral with the shaft 20 or may be a separate component that is affixed to the end of the shaft 20, for example by a threaded connector, a pressed fit, solder, welding, adhesive, or other affixing methods. The cap 50 can have an outer diameter greater than the diameter of the shaft 20. The cap 50 may be generally flat and disc shaped or may be spherical or hemispherical or another shape. In some cases the cap 50 may be designed to be easily gripped by a person's fingers, or by a manipulator component of a mechanical adjusting device.

Figure 5:
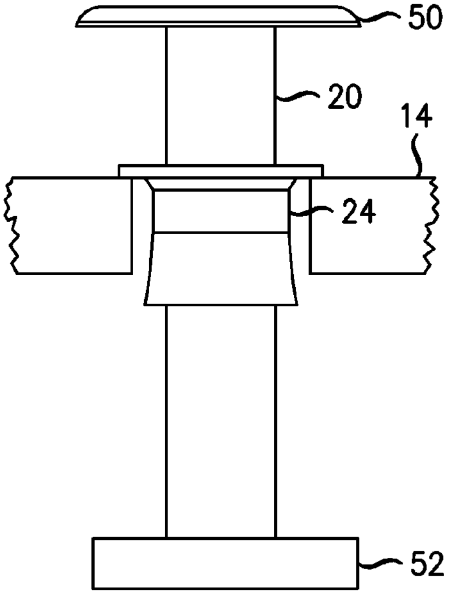
FIG. 5 is a view similar to FIG. 1 showing an alternative embodiment of a tuning assembly.
Figure 6:
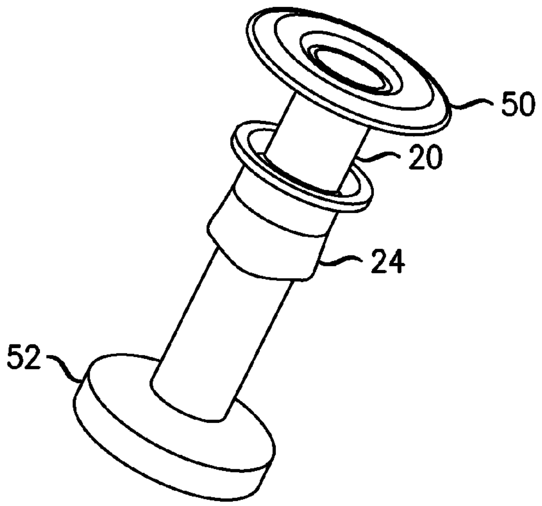
FIG. 6 is a perspective view of the alternative embodiment of FIG. 5.
Figure 7:
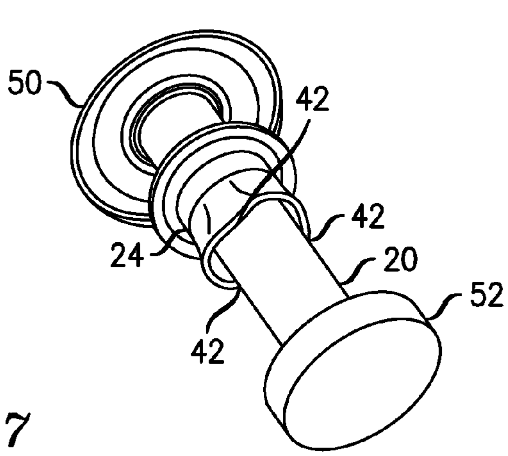
FIG. 7 is another perspective view of the alternative embodiment of FIG. 5.

Also, as shown in the alternative embodiment of FIGS. 5 through 7, the tuning element 10 may include a supplemental tuning body 52 as shown. FIGS. 5 through 7 illustrate an alternative embodiment, having the supplemental tuning body 52 and a variation of the geometry of the skirt 40 and middle portion 26 of the bushing 24. In the illustrated example, the supplemental tuning body 52 is an element affixed to the interior cavity end of the shaft 20. The supplemental tuning body 52 may be affixed to the shaft 20 by for example by a threaded connector, a pressed fit, solder, welding, adhesive, or other affixing methods. The supplemental tuning body 52 can in some applications enhance the sensitivity or effectiveness of the tuning assembly 1 and enhance adjustment motions of the tuning element 10, and can be applied to the embodiment of FIGS. 1 through 3. FIGS. 5 through 7 also illustrate that the middle portion 26 the knurled or ribbed outside diameter feature of the bushing 24 can be omitted and it can have a smooth outer diameter.

The tuning assembly 1 may be manufactured from any of a wide variety of materials. In some examples, the movable tuning element 10 and the bushing 24 are manufactured wholly or partially from metal, or a metalized plastic. If a supplemental tuning body 52 is present, it too in some examples will be manufactured from a metal or metalized plastic. Also, while the bushing 24 in the illustrated examples is a separate component from the wall 14 of the RF component, the bushing 24 can be implemented as an integral aspect of the wall 14.

One example of a method of installing and utilizing the illustrated tuning apparatus will now be described.

Initially, the bushing 24 is installed in the bore hole 12 of the cavity wall 14.

After the bushing 24 is inserted such that the mounting flange 36 is abutting the outside of the wall 12, it can be affixed if desired by soldering, gluing or other attachment methods. Next, the tuning element 10 is inserted through the bushing 24. Generally, the insertion of the tuning element 10 will be done from outside the wall 14 that is defining the cavity 16. However, in some instances the wall 14 may be in the form of a plate that is removable from the remainder of the housing 19 defining the cavity 16. In such instances, both sides of the plate are accessible and therefore the tuning element 10 may be inserted from either direction. Also, in embodiments where the cap 50, and/or a supplement tuning body 52 are provided, one of the other may be affixed to the shaft 20 after the shaft 20 has been installed through the bushing 24.

Next, with the RF component now having the tuning assembly 1 installed in its operative configuration, the tuning element 10 may be manipulated manually, or via a machine, such that it is translated inwardly and outwardly relative to the cavity 16 to effect a tuning process. Manipulation can be done by grasping and moving the cap 50 if one is provided, or by moving the shaft 20 directly if no cap 50 is provided. In some examples, an operator or tuning machine may be performing tuning while RF energy is being supplied to the cavity 16 and the operator or tuning machines is electronically monitoring the performance of the RF component. When the desired performance is achieved, the tuning assembly 1 can be left in place and thus the RF component will function as desired.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. An apparatus for tuning a radio frequency (RF) component having a wall with a bore through the wall, and a cavity, comprising:
- a unitary bushing adapted to be fit into the bore in the wall; and
- a tuning element slidably mounted and received in the bushing,
- wherein the bushing comprises an outwardly tapered skirt and the skirt comprises an engagement surface provided by at least one inwardly projecting portion adapted to directly frictionally engage the tuning element.

2. The apparatus of claim 1, wherein the bushing is adapted to be mounted in a bore in the wall, and the tuning element projects inwardly through the bushing and into the cavity.

3. The apparatus of claim 1, wherein the bushing has two ends and comprises a radially extending outer flange proximate the first end thereof.

4. The apparatus of claim 3, wherein the radially extending flange is adapted to be affixed to the wall.

5. The apparatus of claim 1, wherein the bushing has two ends and comprises an engagement surface at a second end thereof, the engagement surface forming an interference fit with the tuning element.

6. The apparatus of claim 1, wherein the inwardly projecting portion comprises three inwardly deformed regions of the outwardly tapered skirt.

7. The apparatus of claim 1, further comprising a cap disposed at the outside end of the tuning element.

8. The apparatus of claim 1, further comprising a supplemental tuning body disposed at the inward end of the tuning element.

9. A radio frequency (RF) component, comprising:
- one or more walls defining a cavity, with at least one wall having at least one bore therethrough;
- a unitary bushing mounted in a bore in the wall; and
- a tuning element slidably mounted and received in the bushing so that the tuning element projects inwardly through the bushing and into the cavity,
- wherein the bushing comprises an outwardly tapered skirt and the skirt comprises an engagement surface provided by at least one inwardly projecting portion adapted to directly frictionally engage the tuning element.

10. The RF component of claim 9, the bushing has two ends and comprises a radially extending outer flange proximate the first end thereof, and the flange is affixed to the wall.

11. The RF component of claim 9, wherein the bushing has two ends and comprises an engagement surface at a second end thereof, the engagement surface forming an interference fit with the tuning element.

12. The RF component of claim 10, wherein the inwardly projecting portion comprises three inwardly deformed regions of the outwardly tapered skirt.

13. The RF component of claim 9, wherein the wall comprises at least one removable plate and the bushing is installed in a bore in the plate.

14. The RF component of claim 9, further comprising at least one resonator disposed in the cavity.

15. A method of tuning an RF component, comprising:
- providing a bushing mounted in a bore in a wall of the RF component;
- sliding a tuning element that is slidably mounted and received in the bushing so that the tuning element projects inwardly through the bushing and into the cavity by a distance varying according to the sliding of the tuning element,
- wherein the bushing comprises an outwardly tapered skirt and the skirt comprises an engagement surface provided by at least one inwardly projecting portion adapted to directly frictionally engage the tuning element;
- monitoring a performance characteristic of the RF component; and
- releasing the tuning element when a desired performance characteristic is achieved.

16. The method of claim 15, wherein the tuning element is retained after being released by a friction force provided by interference between the tuning element and the bushing.

17. The method of claim 15, wherein the sliding is performed manually by hand by a user.

18. The method of claim 15, wherein the sliding is performed by an automated device.

19. The apparatus of claim 1, wherein the bushing comprises an external surface that engages the bore, wherein the external surface is one of knurled, grooved or roughened.

20. The RF component of claim 9, wherein the bushing comprises an external surface that engages the bore, wherein the external surface is one of knurled, grooved or roughened.

* * * * *